Jan. 20, 1959 G. B. STILLWAGON, JR 2,869,342
SEALING MEANS
Filed May 14, 1954

INVENTOR.
George B. Stillwagon Jr.
BY
HIS ATTORNEYS

United States Patent Office 2,869,342
Patented Jan. 20, 1959

2,869,342

SEALING MEANS

George B. Stillwagon, Jr., Dayton, Ohio, assignor of one-half to Kenneth G. Fraser, Dayton, Ohio Application May 14, 1954, Serial No. 429,759

3 Claims. (Cl. 64—32)

This invention relates to a sealing means for a universal or other movable joint; and has for its object a new and improved means for protecting a joint and making it oil tight and dustproof. That is, the joint is sufficiently sealed so that lubricants on the inside cannot escape and dust from the outside cannot enter.

In sealing means now in use for protecting universal and other movable joints, a sheath-like pliable member is sometimes employed. When this type of sheath is used, damage may occur due to the rough handling to which the sheath is subjected.

One of the objects of the present invention is the provision of a sealing means which has all of the pliability of a continuous sheath and is, in addition, more durable and less subject to failure by reason of the fact that the greater portion of the covering of the joint may be made of metal or other rigid material and the pliability, which allows movement of the joint, is provided by a pliable element or elements protected by the rigid outer sleeve instead of one continuous pliable sheath.

A further object of the invention is the provision of a new and improved means of attaching a pliable element to the couplings of a universal joint and to the metal sleeve which forms a portion of the covering.

Other objects and advantages reside in the construction of parts, the combination thereof and the mode of operation, as will become more apparent from the following description.

Referring to the drawings.

Figure 1:
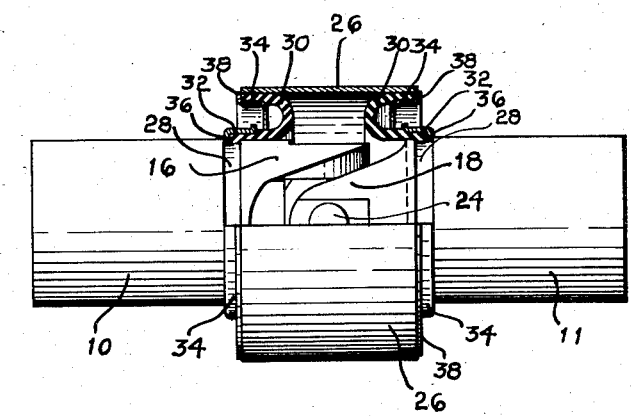
Figure 1 is a longitudinal view showing the sealing means partly in cross section and partly in elevation with portions of the housing broken away.
Figure 2:
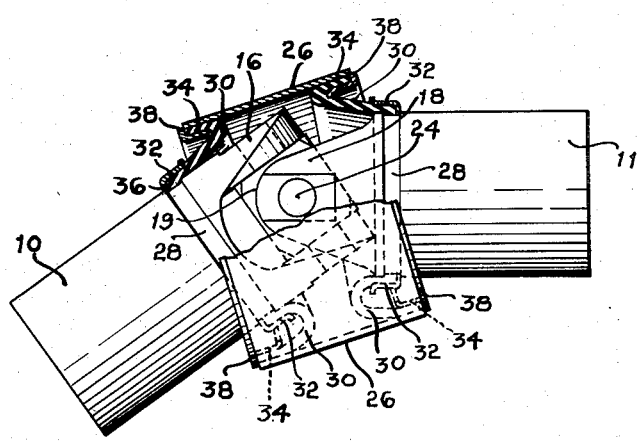
Figure 2 is a longitudinal fragmentary view showing the joint in elevation at an operating angle and the sealing means partly in cross section and partly broken away.

Referring more in detail to the drawing, the universal joint shown comprises shaft members 10 and 11, which have pivotal connection to one another for rotation about intersecting axes. The means for pivotally connecting them may be of any suitable kind. In the coupling shown, the ends of the shafts 10 and 11 are each provided with a pair of jaws 16 and 18 respectively, arranged in planes at substantial right angles to each other.

A connecting block 19 has pivotal connection with both sets of jaws. One pivot is shown at 24. This is a conventional universal joint and is specifically shown merely for the purpose of illustration. Applicant's sealing device may take various forms and may be applied to universal joints or like devices of various kinds. A metal sleeve 26 may be bulged outwardly midway of its ends for more accommodation of the moving parts of the joint.

The metal cylindrical sleeve 26 movably surrounds the universal joint and is of larger diameter than the diameter of the joint in order to accommodate the movement of its various parts. A pair of pliable sleeve members, 30, bridge the gap between the coupling members 10 and 11, and the edges of the sleeve 26 and form a seal between them. The pliable members may be rubber, or plastic, or other synthetic material and may incorporate fabric or other fibers to provide body and strength. Each of the coupling members 10 and 11 is provided with an annular groove 28 adjacent its end, and located in positions also approximately adjacent the ends of the sleeve 26.

A set of rings is provided for the attachment and sealing of the pliable members to the ends of the sleeve and to the annular groove 28 in the coupling members. The set of rings comprises a pair of inner rings 32, and a pair of outer rings 34. Each inner ring 32 is provided with an inwardly directed annular lip or flange 36. The ring 32 is swaged or compressed with the pliable member 30 in place, thus, the material of the member 30 directly under the ring is compressed affording a tight seal. The flange 36 is forced into the groove 28, thus locking ring 32 in place on 10 and 11.

Each outer ring 34 is provided with an outwardly directed annular flange or lip 38. The outer ends of the pliable members 30 are secured to the inner surfaces of the ends of the metal sleeve 26 by means of these outer rings 34. Each ring 34 is provided with an outwardly directed flange 38. The contact may be reinforced by the expansion of the outer ring by mechanical or any other desired means. Instead of expansion of the outer ring, as just described, the margins of the sleeve 26 may be contracted so as to firmly clamp the margin of the flexible members 30 between the sleeve 26 and the rings 34. The flexing of the cover of the joint is confined to members 30, the sleeve 26 merely forming a covering and protective rigid sleeve.

A pair of grooves may be formed, one on the inside of each end of the sleeve 26 forming seats for the margin of the flexible members 30 so as to clamp these margins in position similar to the method of clamping the inner margins of the flexible member 30 to the shafts 10 and 11.

As clearly shown in the drawing, the flexible members 30, when secured in the manner described herein, arch inwardly of the sleeve 26 such that the flexible members 30 are U-shaped in cross section, there being one surface of each flexible member contacting both the inner surface of the sleeve 26 and the exterior surface of one of the coupling members 10 or 11.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a sealing means for the coupling members of a universal joint, a single cylindrical metallic sleeve surrounding said joint and of larger diameter than the coupling members of said joint, a pair of pliable annular sleeve members bridging the gap between the ends of said sleeve and the coupling members of said joint and supporting said sleeve in floating relation to said joint, said pliable members arching internally of said sleeve and being of substantially U-shaped cross-section such that one surface of each pliable member contacts both the exterior surface of a coupling member and the interior surface of said metallic sleeve, a compressible metallic ring securing one end of each pliable member to the exterior surface of one of said coupling members, and an expansible ring securing the other end of each of said pliable members to the inner surface of each end of said cylindrical sleeve.

2. In a sealing means for the coupling members of a universal joint, a single cylindrical metallic sleeve surrounding said joint and of larger diameter than the coupling members of said joint, a pair of pliable annular sleeve members bridging the gap between the ends of said sleeve and the coupling members of said joint and supporting said sleeve in floating relation to said joint, said pliable members arching internally of said sleeve and being of substantially U-shaped cross-section such that one surface of each pliable member contacts both the exterior surface of a coupling member and the interior surface of said metallic sleeve, means for securing one end of each said pliable sleeve member to the exterior surface of one of said coupling members, and means for securing the other end of each said pliable sleeve member to the inner surface at one end of said cylindrical sleeve.

3. A sealing means for a universal joint involving a pair of coupling members comprising a single cylindrical metallic sleeve surrounding said joint and of sufficient length to cover said joint, and flexible means for connecting the ends of said sleeve to the coupling members of said joint and supporting said sleeve in floating relation to said joint, said flexible means including a pair of pliable sleeve members, means securing one end of each pliable member to the inner surface at one end of said sleeve, there being one pliable member secured in this manner to each of the opposite ends of said sleeve, and means for securing the other end of each pliable member to one of said coupling members, there being one pliable member secured to each said coupling member, said pliable members encircling said coupling members, and each arching inwardly of said metallic sleeve so as to obtain a U-shaped cross-section.

References Cited in the file of this patent

UNITED STATES PATENTS

| | | |
|---|---|---|
| 830,203 | Bogart | Sept. 4, 1906 |
| 1,040,417 | Rhodes | Oct. 8, 1912 |
| 1,854,667 | Ragan | Apr. 19, 1932 |
| 1,871,883 | Geyer | Aug. 16, 1932 |
| 2,264,728 | Stillwagon et al. | Dec. 2, 1941 |
| 2,362,456 | Alden | Nov. 14, 1944 |
| 2,575,602 | Stillwagon | Nov. 20, 1951 |